United States Patent [19]

Kim

[11] Patent Number: 5,262,848

[45] Date of Patent: Nov. 16, 1993

[54] WHITE BALANCE CONTROL CIRCUIT FOR VIDEO CAMERA WITH SPECIFIED RANGE CONTROL CIRCUITRY

[75] Inventor: Young J. Kim, Eunpyung, Rep. of Korea

[73] Assignee: Goldstar Co., Ltd., Seoul, Rep. of Korea

[21] Appl. No.: 783,367

[22] Filed: Oct. 28, 1991

[30] Foreign Application Priority Data

Dec. 6, 1990 [KR] Rep. of Korea ............... 19224/1990

[51] Int. Cl.$^5$ ............................................. H04N 9/73
[52] U.S. Cl. ......................................................... 358/29
[58] Field of Search ................................. 358/29, 29 C

[56] References Cited

U.S. PATENT DOCUMENTS 4,922,330  5/1990  Saito et al. ................... 358/29 C
5,119,178  6/1992  Sakata et al. ................. 358/29 C

*Primary Examiner*—Mark R. Powell
*Attorney, Agent, or Firm*—Rosen, Dainow & Jacobs

[57] ABSTRACT

In a color processing circuit for a video camera, there is provided a white balance control circuit for supplying a plurality of white balance control voltages to the color processing circuit, the white balance control circuit comprising a control voltage dividing section for dividing first and second white balance voltages from a white balance control section to generate first through fourth white balance control voltages to the color processing circuit. The control voltage dividing section comprises a first inverting amplifier, a second inverting amplifier operable to vary a color temperature estimating range and an intermediate value of the color temperature estimating range, for outputting the second white balance control voltage, a first voltage divider for outputting the third white balance control voltage, a third inverting amplifier operable to vary the color temperature estimating range and the intermediate value of the color temperature estimating range, for outputting the first white balance control voltage, and a second voltage divider outputting the fourth white balance control voltage, whereby the control voltage dividing section is capable of adjusting a color temperature estimating range.

4 Claims, 5 Drawing Sheets

| COLOR TEMPERATURE | V1 [V] | V2 [V] | V3 [V] | V4 [V] |
|---|---|---|---|---|
| 2500°K | 2.91 | 2.50 | 2.45 | 2.62 |
| 3000°K | 3.89 | 2.57 | 2.39 | 2.68 |
| 3500°K | 2.85 | 2.58 | 2.35 | 2.72 |
| 4000°K | 2.81 | 2.60 | 2.31 | 2.78 |
| 4500°K | 2.79 | 2.63 | 2.30 | 2.84 |
| 5000°K | 2.78 | 2.65 | 2.29 | 2.85 |
| 5500°K | 2.76 | 2.67 | 2.29 | 2.89 |
| 6000°K | 2.76 | 2.69 | 2.29 | 2.92 |
| 6500°K | 2.75 | 2.71 | 2.29 | 2.95 |
| 7000°K | 2.73 | 2.72 | 2.28 | 2.96 |
| 7500°K | 2.72 | 2.73 | 2.28 | 2.97 |

| COLOR TEMPERATURE | V1 [V] | V2 [V] | V3 [V] | V4 [V] |
|---|---|---|---|---|
| 2500°K | 2.91 | 2.50 | 2.45 | 2.62 |
| 3000°K | 3.89 | 2.57 | 2.39 | 2.68 |
| 3500°K | 2.85 | 2.58 | 2.35 | 2.72 |
| 4000°K | 2.81 | 2.60 | 2.31 | 2.78 |
| 4500°K | 2.79 | 2.63 | 2.30 | 2.84 |
| 5000°K | 2.78 | 2.65 | 2.29 | 2.85 |
| 5500°K | 2.76 | 2.67 | 2.29 | 2.89 |
| 6000°K | 2.76 | 2.69 | 2.29 | 2.92 |
| 6500°K | 2.75 | 2.71 | 2.29 | 2.95 |
| 7000°K | 2.73 | 2.72 | 2.28 | 2.96 |
| 7500°K | 2.72 | 2.73 | 2.28 | 2.97 |

WHITE BALANCE CONTROL CIRCUIT FOR VIDEO CAMERA WITH SPECIFIED RANGE CONTROL CIRCUITRY

BACKGROUND OF THE INVENTION

1. Field of the Invention

The present invention relates in general to a white balance control circuit for a video camera, and more particularly to a white balance control circuit for adjusting a color temperature estimating range to compensate for errors in white balance control voltages in the video camera.

2. Description of the Prior Art

Figure 1:
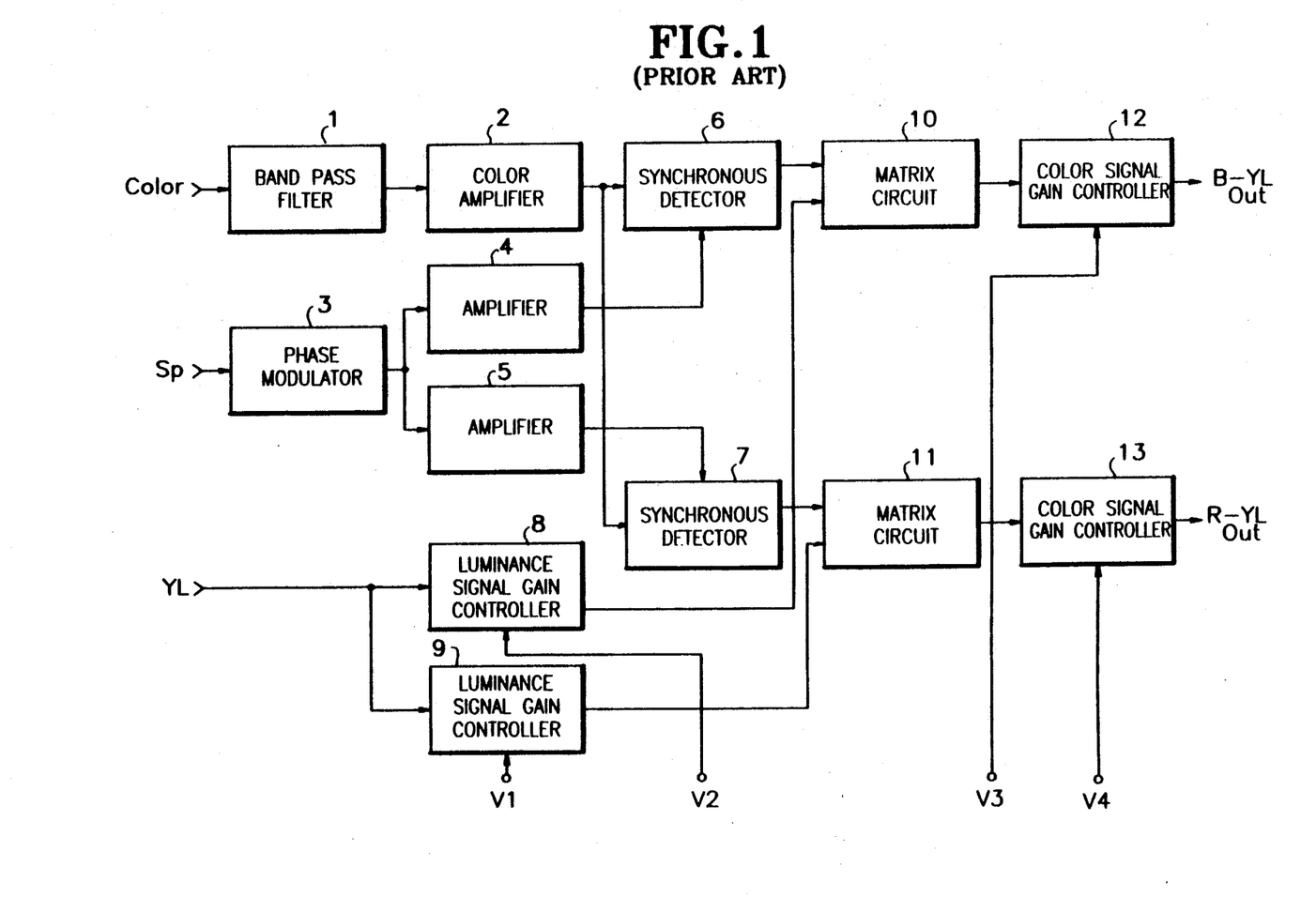
FIG. 1 is a circuit diagram of a typical color processing circuit for a video camera.

FIG. 1, shows a circuit diagram of a typical color processing circuit for a video camera. As shown in this drawing, the color processing circuit comprises a band pass filter 1 for band pass-filtering a color signal, a color amplifier 2 for amplifying an output signal from the band pass filter 2, a phase modulator 3 for modulating a phase of a synchronous signal Sp, first and second amplifiers 4 and 5 for amplifying an output signal from the phase modulator 3 respectively, first and second synchronous signal detectors 6 and 7 for detecting a color synchronous signal from an output signal from the color amplifier 2 respectively in accordance with output signals from the first and second amplifiers 4 and 5, first and second luminance signal gain controllers 8 and 9 for controlling a gain of a luminance signal $Y_L$ respectively in accordance with white balance control voltages V2 and V1, first and second matrix circuits 10 and 11 for combining output signals from the first and second synchronous signal detectors 6 and 7 with output signals from the first and second luminance signal gain controllers 8 and 9, respectively, to output difference signals $B-Y_L$ and $R-Y_L$, and first and second color gain controllers 12 and 13 for controlling gains of output signals from the first and second matrix circuits 10 and 11 respectively in accordance with white balance control voltages V3 and V4.

Figure 2:
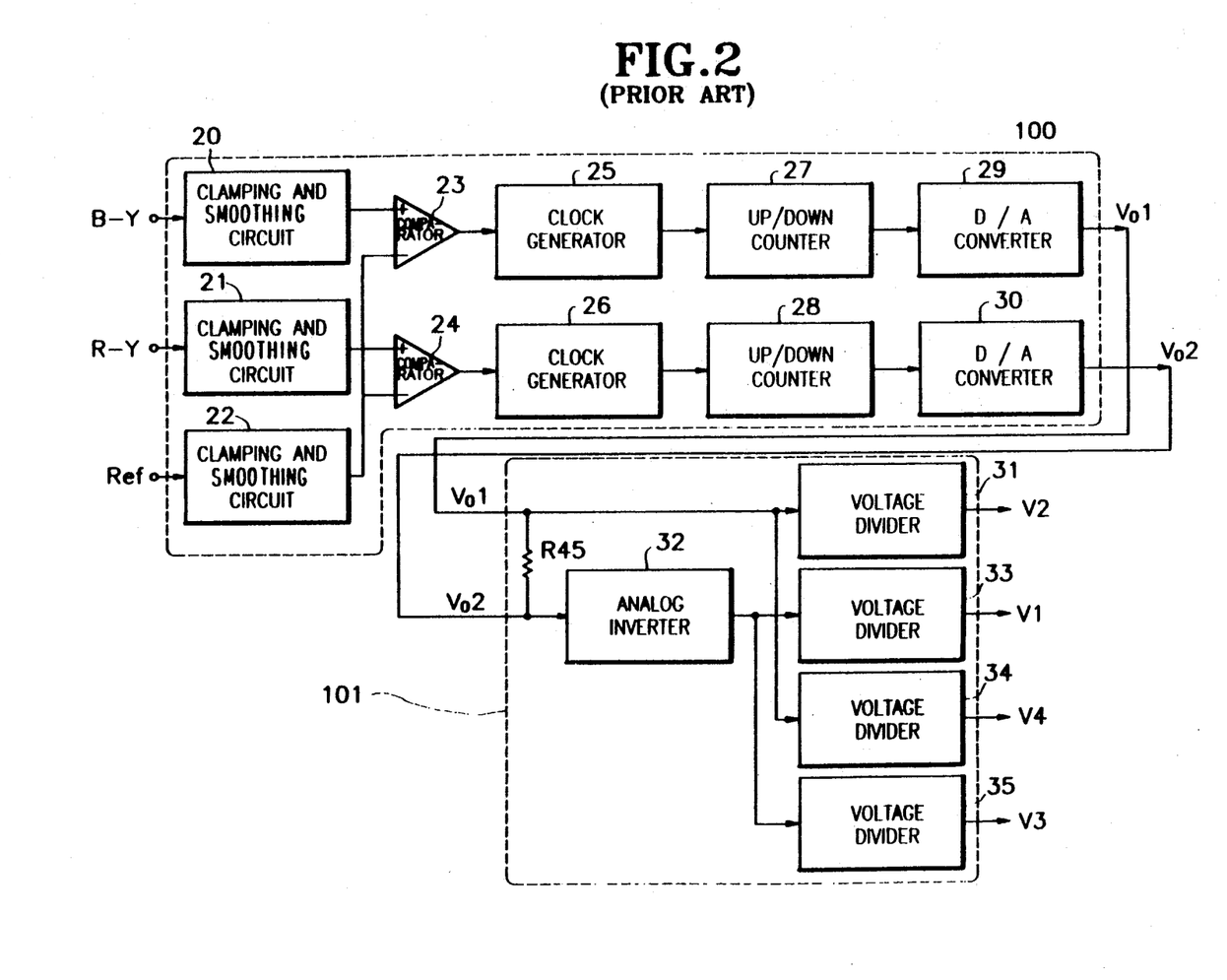
FIG. 2 is a circuit diagram of a conventional white balance control circuit.

FIG. 2, shows a circuit diagram of a conventional white balance control circuit. The illustrated white balance control circuit comprises a white balance control section 100 for comparing difference signals B-Y and R-Y with a reference signal Ref respectively and performing up/down-counting operations in accordance with the compared results to generate balance voltages Vo1 and Vo2, and a control voltage dividing section 101 for dividing the balance voltages Vo1 and Vo2 from the white balance control section 100 to generate the white balance control voltages V1 through V4 to the color processing circuit.

The white balance control section 100 includes first to third clamping and smoothing circuits 20 through 22 for clamping the difference signals B-Y and R-Y and the reference signal Ref respectively and smoothing the clamped difference signals B-Y and R-Y and the clamped reference signal Ref respectively, first and second comparators 23 and 24 for comparing the difference signals B-Y and R-Y outputted from the first and second clamping and smoothing circuits 20 and 21 with the reference signal Ref outputted from the third clamping and smoothing circuit 22 respectively, first and second clock generators 25 and 26 for generating up/down-clock signals respectively in response to output signals from the first and second comparators 23 and 24, first and second counters 27 and 28 for up/down-counting output signals from the first and second clock generators 25 and 26, and first and second digital/analog converters 29 and 30 for converting output signals from the first and second counters 27 and 28 into the analog voltages Vo1 and Vo2 respectively.

On the other hand, the control voltage dividing section 101 includes voltage dividers 31 and 34 for dividing the balance voltage vo1 outputted from the first digital/analog converter 29 in the white balance control section 100 by a predetermined level respectively to output the white balance control voltages V2 and V4 to the first luminance signal gain controller 8 and the second color gain controller 13 in the color processing circuit, an analog inverter 32 for inverting a level of the balance voltage Vo2 outputted from the second digital/analog converter 30, and voltage dividers 33 and 35 for dividing an output signal from the analog inverter 32 by a predetermined level respectively to output the white balance control voltages V1 and V3 to the second luminance signal gain controller 9 and the first color gain controller 12 in the color processing circuit. Herein, the reference numeral R45, not described, designates a resistor for compensating for the balance voltages Vo1 and Vo2.

Figure 3:
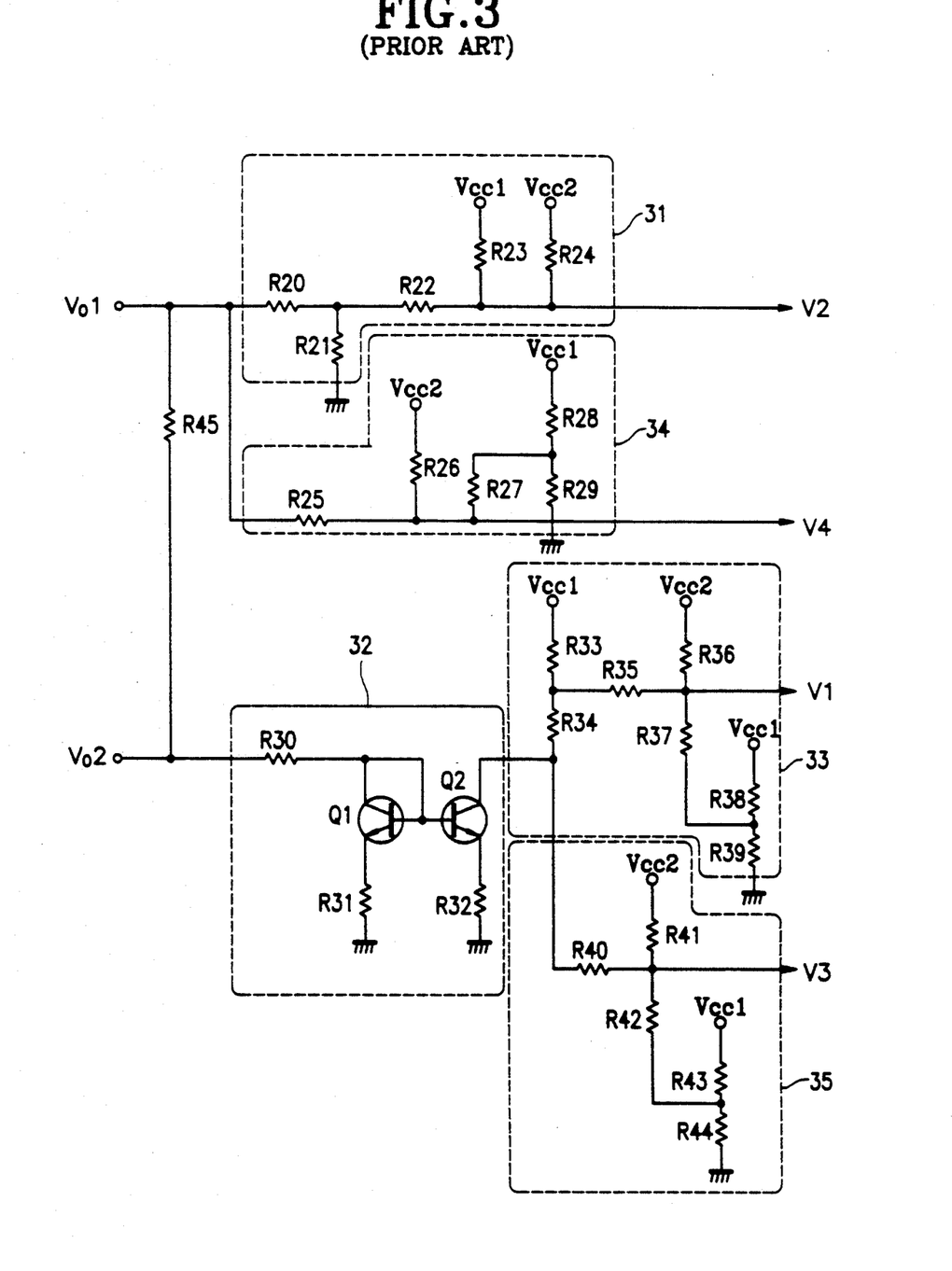
FIG. 3 is a detailed circuit diagram of a control voltage dividing section in FIG. 2.

With reference to FIG. 3, there is shown a detailed circuit diagram of the control voltage dividing section 101 shown in FIG. 2. As shown in this drawing, the resistor R45 in the control voltage dividing section 101 is connected between balance voltage Vo1 and Vo2 output terminals of the first and second digital/analog converters 29 and 30 in the white balance control section 100. Also, the first voltage divider 31 is provided with resistors R20 and R22, a second white balance control voltage V2 output terminal connected to the balance voltage Vo1 output terminal of the first digital/analog converter 29 in the white balance control section 100 through the resistors R20 and R22, a ground resistor R21 connected between the resistors R20 and R22, and resistors R23 and R24 connected between the resistor R22 and the second white balance control voltage V2 output terminal, each being applied with first and second source voltages Vcc1(5 V) and Vcc2 (2.7 V).

The third voltage divider 34 is provided with a resistor R25, a fourth white balance control voltage V4 output terminal connected to the balance voltage Vo1 output terminal of the first digital/analog converter 29 in the white balance control section 100 through the resistor R25 and the fourth white balance control voltage V4 output terminal, the resistor R26 being supplied with the second source vlotage Vcc2, resistors R28 and R29 for dividing the first source voltage Vcc1, and a resistor R27 connected between the resistors R28 and R29 at one of its sides and connected between the resistor R25 and the fourth white balance control voltage V4 output terminal at the other of its sides.

The analog inverter 32 is provided with a resistor R30, a transistor Q1 including its collector and base connected commonly to the balance voltage Vo2 output terminal of the second digital/analog converter 30 in the white balance control section 100 through the resistor R30 and its emitter connected to ground via a resistor R31, and a transistor Q2 including its base connected, in common with the base and the collector of the transistor Q1, to the balance voltage Vo2 output terminal of the second digital/analog converter 30 in the white balance control section 100 through the resistor R30, its emitter connected to ground via a resistor R32 and its collector for outputting a signal into which the balance voltage Vo2 from the second digital/analog converter 30 is inverted.

Also, the second voltage divider 33 is provided with resistors R33 and R34 connected between the collector of the transistor Q2 in the analog inverter 32 and the first source voltage Vcc1 terminal, a first white balance control voltage V1 output terminal connected between the resistors R33 and R34 via a resistor R35, a resistor R36 connected between the resistor R35, a resistor R36 connected between the resistor R35 and the first white balance control voltage V1 output terminal, the resistor R36 being applied with the second source voltage Vcc1, and a resistor R37 connected between the resistor R35 and the first white balance control voltage V1 output terminal at its one side and connected between the resistors R38 and R39 at its other side.

On the other hand, the fourth voltage divider 35 is provided with a resistor R40, a third white balance control voltage V3 output terminal connected to the collector of the transistor Q2 in the analog inverter 32 via the resistor R40, a resistor R41 connected between the resistor R40 and the third white balance control voltage V3 output terminal at one of its sides and connected between the resistors R43 and R44 at the other of its sides.

The operation of the conventional white balance control circuit with the above-mentioned construction will be described.

The color processing in the video camera is performed by the circuit shown in FIG. 1. As shown in FIG. 1, the color signal color is inputted by the 4.77 MHz band pass filter 1 and the filtered color signal is then amplified by the color amplifier 2. Also, the synchronous signal Sp is phase-modulated by the phase modulator 3, so that the synchronous signal Sp has a phase appropriate to the color signal processing in the video camera. The phase-modulated synchronous signal is amplified by the first and second amplifiers 4 and 5 by the corresponding gains, respectively. In accordance with the output signals from the first and second amplifiers 4 and 5, the first and second synchronous signal detectors 6 and 7 detect the synchronous signals of blue(B) and red(R) signals, respectively, from the output signal from the color amplifier 2. At this time, the luminance signal $Y_L$ is gain-controlled by the first and second luminance signal gain controllers 8 and 9, respectively, in accordance with the white balance control voltages V2 and V1, for the purpose of respective combination with the B and R signals.

Then, the output signals from the first and second synchronous signal detectors 6 and 7 and the output signals from the first and second luminance signal gain controllers 8 and 9 are combined respectively into $B-Y_L$ and $R-Y_L$ signals by the first and second matrix circuits 10 and 11. The output signals from the first and second matrix circuits 10 and 11 are gain-controlled respectively by the first and second color gain controllers 12 and 13, respectively, in accordance with the white balance control voltages V3 and V4. As a result, the white balance-controlled $B-Y_L$ and $R-Y_L$ signals are outputted from the first and second color gain controllers 12 and 13.

As mentioned above, the color processing circuit for the video camera requires the white balance control voltages V1-B4 for the purpose of the control of the white balance. The white balance control voltages V1 through V4 are conventionally supplied by the white balance control circuit shown in FIG. 2.

First in the white balance control section 100 of the white balance control circuit, the difference signals B-Y and R-Y and the reference signal Ref are clamped and smoothed by the clamping and smoothing circuits 20 through 22. Then, the clamped and smoothed difference signal B-Y and the clamped and smoothed reference signal Ref are compared with each other by the first comparator 23 and the clamped and smoothed difference signal R-Y and the clamped and smoothed reference signal Ref are compared with each other by the second comparator 24. The first comparator 23 outputs a high level signal if the level of the clamped and smoothed difference signal B-Y is over the level of the clamped and smoothed reference signal Ref; a low level signal if the level of the clamped and smoothed difference signal B-Y is below the level of the clamped and smoothed reference signal Ref. Also, the second comparator 24 outputs a low level signal if the level of the clamped and smoothed difference signal R-Y is over the level of the clamped and smoothed reference signal Ref; a high level signal if the level of the clamped and smoothed difference signal R-Y is below the level of the clamped and smoothed reference signal Ref. As a result, the first and second clock generators 25 and 26 generate up-count clock signals when the first and second comparators 23 and 24 output the high level signals; down-count clock signals when the first and second comparators 23 and 24 output the low level signals. The first and second up/down counters 27 and 28 perform up/down-counting operations as a result of the levels of output signals from the first and second clock generators 25 and 26. The counted values from the first and second up/down counters 27 and 28 are converted respectively into analog signals, Vo1 and Vo2, by the first and second digital/analog converters 29 and 30.

In other words, the balance voltage vo1 is increased in level by up-counting operation when the level of the difference signal B-Y is above the level of the reference signal Ref; is reduced in level by down-counting operation when the level of the difference signal B-Y is below the level of the reference signal Ref. On the other hand, the balance voltage Vo2 is decreased in level by down-counting operation when the level of the difference signal R-Y is above the level of the reference signal Ref; is increased in level by up-counting operation when the level of the difference signal R-Y is below the level of the reference signal Ref. The balance voltages Vo1 and Vo2 are then respectively divided into the white balance control voltages V1 through V4 by the control voltage dividing section 101, each being supplied to the color processing circuit. Namely, the balance voltage Vo1 is divided into the white balance control voltages V2 and V4 by the first and third voltage dividers 31 and 34 and the balance voltage Vo2 is inverted by the analog inverter 32 and then divided into the white balance control voltages V1 and V3 by the second and fourth voltage dividers 33 and 35.

To explain it in more detail, as shown in FIG. 3, the balance voltage Vo1 is divided into the white balance control voltage V2 by the resistors R20 through R24 and the first and second source voltages Vcc1 (5 V) and Vcc2 (2.27 V) in the first voltage divider 31 and into the white balance control voltage V4 by the resistors R25 through R29 and the first and second source voltages Vcc1 and Vcc2 in the third voltage divider 34, and then the white balance control voltages V2 and V4 are supplied respectively to the first luminance signal gain controller 8 and the second color gain controller 13 in the color processing circuit. On the other hand, the balance voltage Vo2 is inverted by the transistors Q1 and Q2 and the resistors R30 through R32 in the analog inverter 32 and then divided into the white balance control voltage V1 by the resistors R33 through R39 and the first and second source voltages Vcc1 and Vcc2 in the second voltage divider 33 and into the white balance control voltage V3 by the resistors R40 through R44 and the first and second source voltages Vcc1 and Vcc2 in the fourth voltage divider 35, and then the white balance control voltages V1 and V3 are supplied respectively to the second luminance signal gain controller 9 and the first color gain controller 12 in the color processing circuit.

However, the conventional white balance control circuit has disadvantages as follows:

First, the white balance control voltage values are different from those proposed by the designer due to natural errors of the resistors, in that the control voltage dividing section is comprised of the first and second source voltage terminals and a multiplicity of resistors in an overlapping form.

Second, the color temperature estimating range cannot be adjusted, in that the white balance control voltage ranges are fixed as the resistors are designed with fixed values. Preferably, the white balance control voltage ranges must become wider as the color temperature ranges become wider.

SUMMARY OF THE INVENTION

Therefore, it is an object of the present invention to provide a white balance control circuit for a video camera, which is capable of varying a color temperature estimating range by varying white balance control voltage ranges, for the purpose of enhancement in image quality in the video camera.

In accordance with the present invention, in a color processing circuit for a video camera, a white balance control circuit is provided for supplying a plurality of white balance control voltages to the color processing circuit, said white balance control circuit comprising white balance control section for comparing first and second difference signals with a reference signal respectively and performing up/down-counting operations in accordance with the compared results to generate first and second white balance voltages and control voltage dividing section for dividing the first and second white balance vlotages from the white balance control section to generate first through fourth white balance control voltages to the color processing circuit; wherein the control voltage dividing scction comprises: a first resistor for compensating for the first and second white balance voltages with respect to each other; a first inverting amplifier for inverting-amplifying the first white balance voltage from the white balance control section; a second inverting amplifier for inverting amplifying an output signal from the first inverting amplifier and outputting the inverting amplified signal as the second white balance control voltage, the second inverting amplifier being operable to vary a color temperature estimating range and an intermediate value of the color temperature estimating range; a first voltage divider for voltage-dividing the output signal from the first inverting amplifier and outputting the voltage-divided signal as the third white balance control voltage; a third inverting amplifier for inverting-amplifying the second white balance voltage from the white balance control section and outputting the inverting-amplified signal as the first white balance control voltage, the third inverting amplifier being operable to vary the color temperature estimating range and the intermediate value of the color temperature estimating range; and the intermediate value of the color temperature estimating range; and a second voltage divider for voltage-dividing the second white balance voltage from the white balance control section and outputting the voltage-divided signal as the fourth white balance control voltage; whereby the control voltage dividing section is capable of adjusting a color temperature estimating range.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF PREFERRED EMBODIMENTS

First, a construction of a white balance control circuit of the present invention will be described with reference to FIGS. 4 and 5.

Figure 4:
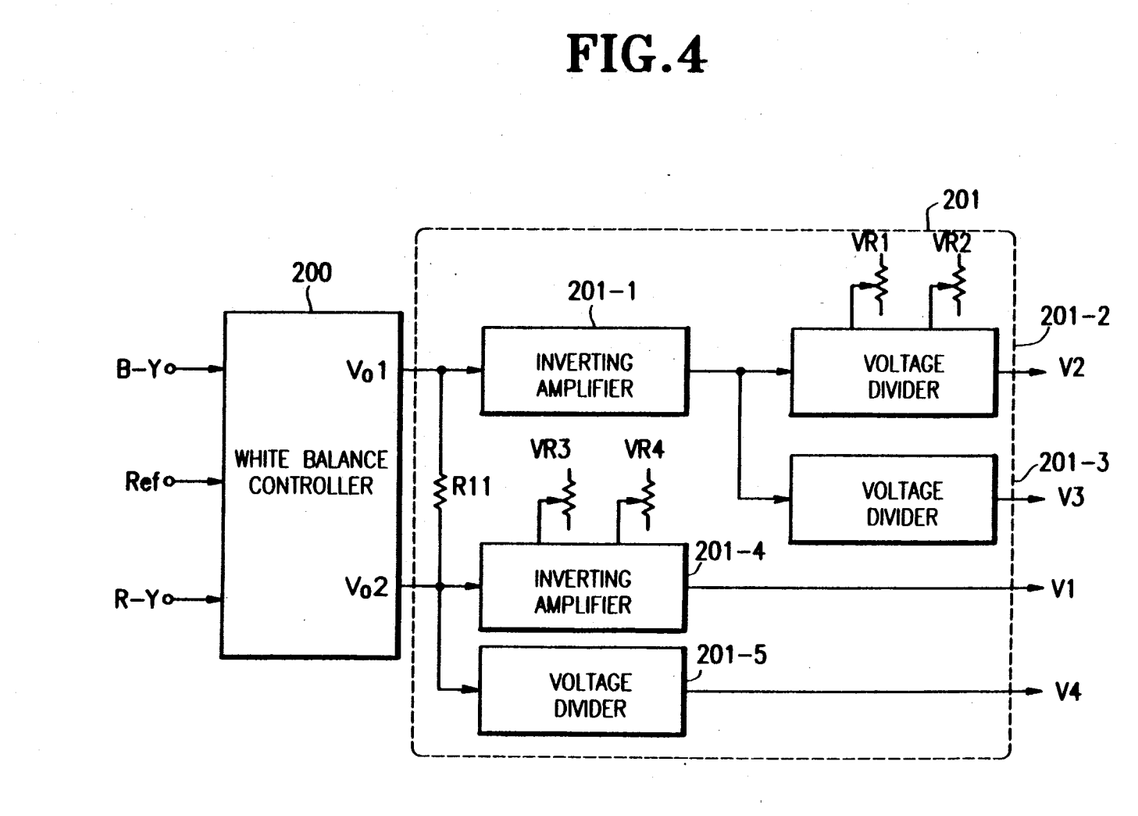
FIG. 4 is a circuit diagram of a white balance control circuit of the present invention.

FIG. 4, shows a circuit diagram of the white balance control circuit of the present invention. As shown in this drawing, the white balance control circuit comprises a white balance control section 200 for comparing difference signals B-Y and R-Y with a reference signal Ref respectively and performing up/down-counting operations in accordance with the compared results to generate white balance voltages Vo1 and Vo2, and a control voltage dividing section 201 for dividing the white balance voltages Vo1 and Vo2 from the white balance control section 200 to generate white balance control voltages V1 through V4 to the color processing circuit.

The control voltage dividing section 201 includes a first inverting amplifier 201-1 for inverting-amplifying the output signal Vo1 from the white balance control section 200, a second inverting amplifier 201-2 for inverting-amplifying an output signal from the first inverting amplifier 201-1 in accordance with a gain and a reference value adjusted by variable resistors VR1 and VR2 and outputting the inverting-amplified signal as the white balance control voltage V2, a first voltage divider 201-3 for voltage-dividing the output signal from the first inverting amplifier 201-1 and outputting the voltage-divided signal as the white balance control voltage V3, a third inverting amplifier 201-4 for inverting-amplifying the output signal Vo2 from the white balance control section 200 in accordance with a gain and a reference value adjusted by variable resistors VR3 and VR4 and outputting the inverting-amplified signal as the white balance control voltage V1, and a second voltage divider 201-5 for voltage-dividing the output signal Vo2 from the white balance control section 200 and outputting the voltage-divided signal as the white balance control voltage V4. Herein, the reference numeral R11, not described, designates a resistor for compensating for the balance voltages Vo1 and Vo2.

Figure 5:
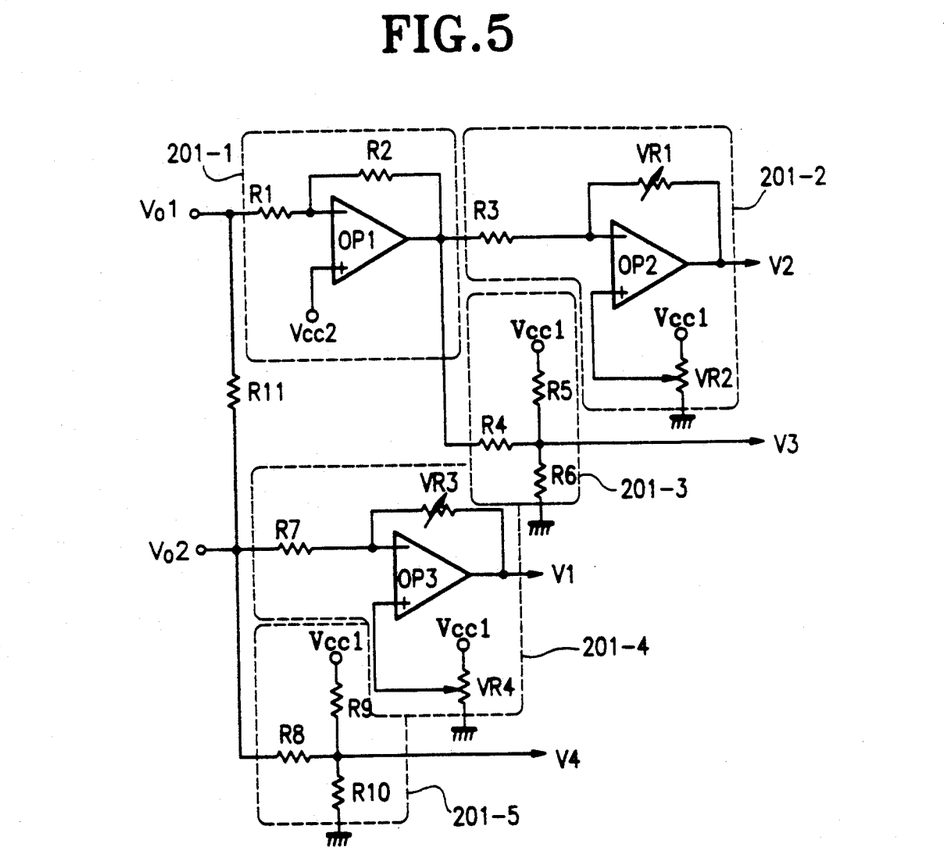
FIG. 5 is a detailed circuit diagram of a control voltage dividing section in FIG. 4.

FIG. 5, shows a detailed circuit diagram of the control voltage dividing section 201 in FIG. 4. As shown in this drawing, the resistor R11 in the control voltage dividing section 201 is connected between balance voltages Vo1 and Vo2 output terminals of the white balance control section 200. Also, the first inverting amplifier 201-1 is provided with resistors R1 and R2 and an operational amplifier OP1 with its inverting input terminal connected to the Vo1 output terminal Vo1 of the white balance control section 200 via the resistor R1, its non-inverting input terminal connected to the second source voltage terminal Vcc2 and its output terminal connected to the inverting input terminal of the operational amplifier OP1 via the resistor R2.

The second inverting amplifier 201-2 is provided with a resistor R3, a variable resistor VR1, a variable resistor VR2 for dividing the first source voltage Vcc1, and an operational amplifier OP2 with its inverting input terminal connected to the output terminal of the operational amplifier OP1 in the first inverting amplifier 201-1 via the resistor R3, its non-inverting input terminal connected to a movable terminal of the variable resistor VR2 and its output terminal connected to the inverting input terminal of the operational amplifier OP2 via the variable resistor VR1, for outputting the white balance control voltage V2.

Also, the first voltage divider 201-3 is provided with a resistor R4, a resistor R5 connected to the first source voltage terminal Vcc1, a resistor R6 connected to ground and a white balance control voltage V3 output terminal connected to the output terminal of the operational amplifier OP1 in the first inverting amplifier 201-1 via the resistor R4 and connected between the resistors R5 and R6.

The third inverting amplifier 201-4 is provided with a resistor R7, a variable resistor VR3, a variable resistor VR4 for dividing the first source voltage Vcc1, and an operational amplifier OP3 with its inverting input terminal connected to the Vo2 output terminal Vo2 of the white balance control section 200 via the resistor R7, its non-interting input terminal connected to a movable terminal of the variable resistor VR4 and its output terminal connected to the inverting input terminal of the operational amplifier OP3 via the variable resistor VR3, for outputting the white balance control voltage V1.

On the other hand, the second voltage divider 201-5 is provided with a resistor R8, a resistor R9 connected to the first source voltage terminal Vcc1, a resistor R10 connected to ground and a white balance control voltage V4 output terminal connected to the Vo2 output terminal Vo2 of the white balance control section 200 via the resistor R8 and connected between the resistors R9 and R10.

Now, the operation of the white balance control circuit with the above-mentioned construction in accordance with the present invention will be described in detail.

The color processing in the video camera is performed by the circuit shown in FIG. 1. As mentioned above with reference to FIG. 1, the color processing circuit for the video camera requires the white balance control voltages V1 and V2 for the purpose of the control of the gain of the luminance signal $Y_L$ and the white balance control voltages V3 and V4 for the purpose of control of gains of the color signals from the matrix circuit. In accordance with the white balance control voltages V1 through V4, the color processing circuit can control the white balance of an image signal picked up by the video camera. The white balance control voltages V1 through V4 required to perform the color processing can be generated by the white balance control circuit shown in FIG. 4 in accordance with the present invention.

The construction and operation of the white balance control section 200 in the white balance control circuit of the present invention are the same as those of the white balance control section 100 in FIG. 2.

Namely, the white balance control section 200 compares the difference signals B-Y and R-Y with the reference signal Ref respectively, performs up/down-counting operations in accordance with the compared results and converts the counted values respectively into analog signals to generate the white balance voltages Vo1 and Vo2. Then, the control voltage dividing section 201 divides the white balance voltages Vo1 and Vo2 from the white balance control section 200 into the white balance control voltages V1 through V4 being supplied to the color processing circuit. Herein, the control voltage dividing section 201 in the white balance control circuit of the present invention is capable of varying the color temperature estimating range by its variable resistors.

First, the output voltage Vo1 from the white balance control section 200 is compared with the second source voltage Vcc2 and is inverting-amplified in accordance with the compared result by the first inverting-amplifier 201-1, with the gain being fixed by the fixed resistors R1 and R2. The output signal from the first inverting-amplifier 201-1 is inverting-amplified by the second inverting amplifier 201-2, with the gain being adjusted by the variable resistor VR1 and the reference value being adjusted by the variable resistor VR2. For the purpose of obtaining the white balance control voltage V2, the variable resistor VR1 is adapted to vary the color temperature estimating range and the variable resistor VR2 is adapted to vary an intermediate value of the color temperature estimating range.

Also, the output voltage Vo2 from the white balance control section 200 is inverting-amplified by the third inverting amplifier 201-4, with the gain being adjusted by the variable resistor VR3 and the reference value being adjusted by the variable resistor VR4. For the purpose of obtaining the white balance control voltage V1, the variable resistor VR3 is adapted to vary the color temperature estimating range and the variable resistor VR4 is adapted to vary an intermediate value (about 4,200° K.) of the color temperature estimating range.

On the other hand, the first voltage divider 201-3 divides the output signal from the first inverting amplifier 201-1 by the fixed resistors R4, R5 and R6 and the first source voltage Vcc1 to obtain the white balance control voltage V3. Similarly, the second voltage divider 201-5 divides the output voltage Vo2 from the white balance control section 200 by the fixed resistors R8, R9 and R10 and the first source voltage Vcc1 to obtain the white balance control voltage V4.

The white balance control voltages V3 and V4 are supplied respectively to the $B-Y_L$ and $R-Y_L$ color gain controllers 12 and 13 in the color processing circuit in FIG. 1. Although the white balance control voltages V3 and V4 are merely obtained by the voltage-dividing operation by the fixed resistors and thus may not make the color temperature estimating range very precise, they have no significant effect on the control of the white balance.

On the other hand, the white balance control voltages V2 and V1 obtained respectively from the second inverting amplifier 201-2 and the third inverting amplifier 201-4 are supplied respectively to the luminance signal gain controllers 8 and 9 in the color processing circuit. These white balance control voltages V1 and V2 have respective errors generated with respect to the color temperature estimating range and the intermediate value of the color temperature estimating range, resulting in an effect on the control of the white balance. Therefore, in accordance with the present invention, the color temperature estimating range and the intermediate value of the color temperature estimating range may be varied by the variable resistors for the purpose of compensation for the errors in the white balance control voltages V1 and V2.

Figure 6:
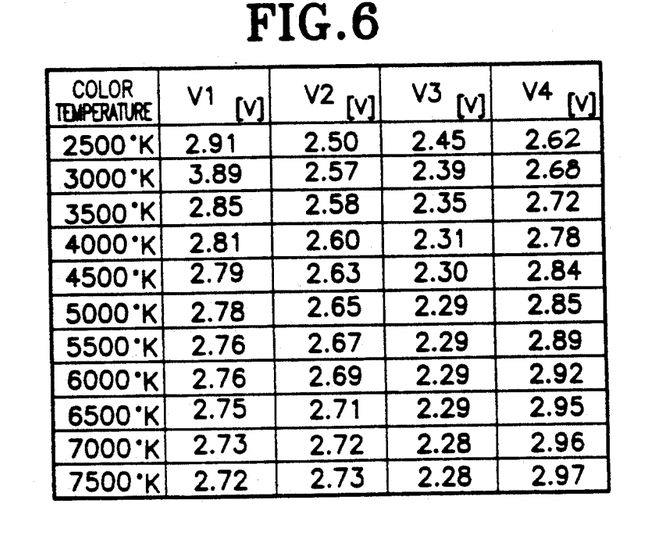
FIG. 6 is a table illustrating the relationship between a color temperature estimation range and white balance control voltages in accordance with the present invention.

With reference to FIG. 6, there is shown a table illustrating the relationship between the color temperature estimating range and the white balance control voltages in accordance with the present invention, these being obtained from several experiments in accordance with the present invention. As shown in this table, the levels of the white balance control voltages V1 and V3 are reduced as the color temperature is increased; the levels of the white balance control voltages V2 and V4 are increased as the color temperature is increased. As a result, the white balance control voltage values can optionally be adjusted by the variable resistors with respect to the color temperature estimating range and the intermediate value(about 4,200° K.) of the color temperature estimating range.

On the other hand, when the levels of the white balance voltages Vo1 and Vo2 are increased or decreased simultaneously, the white balance voltages Vo1 and Vo2 have no significant effect on each other. That is, the levels of the white balance voltages Vo1 and Vo2 are simultaneously increased when the color temperature is increased; are simultaneously decreased when the color temperature is decreased. On the other hand, when the level of one of the white balance voltages Vo1 and Vo2 is increased while the level of the other is decreased, the voltage difference between the white balance voltages Vo1 and Vo2 is compensated for by the resistor R11 for the purpose of restricting the control of the white balance. As hereinbefore described, in accordance with the present invention, the white balance control circuit for the video camera is provided, which is capable of varying the white balance control voltages with respect to the color temperature estimating range and the intermediate value of the color temperature estimating range by varying the gains and reference values by means of the inverting amplifiers in dividing the white balance control voltages, so that the circuit can compensate for errors in the white balance control voltages with respect to the color temperature estimating range. Therefore, the image quality can be enhanced by the color processing in the video camera.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A color processing circuit for a video camera, comprising:
   white balance control means for comparing first and second difference signals with a reference signal respectively and performing up/down-counting operations in accordance with the compared results to generate first and second white balance voltage; and
   control voltage dividing means for dividing the first and second white balance voltages from said white balance control means to generate first through fourth white balance control means to generate first through fourth white balance control voltages to the color processing circuit, said control voltage dividing means comprising variable resistors for adjusting a color temperature estimating range,
   said control voltage dividing means comprises:
   a first resistor for compensating for the first and second white balanced voltages with respect to each other;
   a first inverting amplifier for inverting-amplifying the first white balance voltage from said white balance control means;
   a second inverting amplifier for inverting-amplifying an output signal from said first inverting amplifier and outputting the inverting-amplified signal as the second white balance control voltage, said second inverting amplifier being operable to vary the color temperature estimating range;
   a first voltage divider for voltage-dividing the output signal from said first inverting amplifier and outputting the voltage-divided signal as the third white balance control voltage;
   a third inverting amplifier for inverting-amplifying the second white balance voltage from said white balance control means and outputting the inverting-amplified signal as the first white balance control voltage, said third inverting amplifier being operable to vary the color temperature estimating range and the intermediate value of the color temperature estimating range; and a second voltage divider for voltage-dividing the second white balance voltage from said white balance control means and outputting the voltage-divided signal as the fourth white balance control voltage.

2. A white balance control circuit as set forth in claim 1, wherein said first inverting amplifier includes:
   second and third resistors; and
   a first operational amplifier including its inverting input terminal connected to the first white balance voltage output terminal of said white balance control means via said first resistor, its non-inverting input terminal connected to a source voltage terminal and its output terminal connected to the inverting input terminal of said first operational amplifier via said third resistor.

3. A white balance control circuit as set forth in claim 1, wherein said second inverting amplifier includes:
   a fourth resistor;
   a first variable resistor;

a second variable resistor for dividing another source voltage; and a second operational amplifier including its inverting input terminal connected to the output terminal of said first operational amplifier in said first inverting amplifier via said fourth resistor, its non-inverting input terminal connected to a movable terminal of said second variable resistor and its output terminal connected to the inverting input terminal of said second operational amplifier via said first variable resistor, for outputting the second white balance control voltage.

4. A white balance control circuit as set forth in claim 1, wherein said third inverting amplifier includes:

a fifth resistor;

a third variable resistor;

a fourth variable resistor for dividing said another source voltage; and a third operational amplifier including its inverting input terminal connected to the second white balance voltage output terminal of said white balance control means via said fifth resistor, its non-inverting input terminal connected to a movable terminal of said fourth variable resistor and its output terminal connected to the inverting input terminal of said third operational amplifier via said third variable resistor, for outputting the first white balance control voltage.

* * * * *